(12) United States Patent
Paltrie et al.

(10) Patent No.: US 10,541,589 B2
(45) Date of Patent: Jan. 21, 2020

(54) MOTOR VEHICLE STARTER EQUIPPED WITH A THERMAL PROTECTION SYSTEM

(71) Applicant: Valeo Equipements Electriques Moteur, Creteil (FR)

(72) Inventors: Thierry Paltrie, Isle D'abeau (FR); Jérémie Chamroux, Isle D'abeau (FR)

(73) Assignee: Valeo Equipements Electriques Moteur, Creteil (FR)

(*) Notice: Subject to any disclaimer, the term of this patent is extended or adjusted under 35 U.S.C. 154(b) by 211 days.

(21) Appl. No.: 15/738,259

(22) PCT Filed: Jun. 22, 2016

(86) PCT No.: PCT/FR2016/051528
§ 371 (c)(1),
(2) Date: May 16, 2018

(87) PCT Pub. No.: WO2016/207547
PCT Pub. Date: Dec. 29, 2016

(65) Prior Publication Data
US 2018/0248452 A1    Aug. 30, 2018

(30) Foreign Application Priority Data
Jun. 26, 2015 (FR) .................................... 15 55913

(51) Int. Cl.
*H02K 11/25* (2016.01)
*H02K 5/14* (2006.01)
(Continued)

(52) U.S. Cl.
CPC .............. *H02K 11/25* (2016.01); *F02N 11/10* (2013.01); *H02H 7/0822* (2013.01);
(Continued)

(58) Field of Classification Search
CPC . H02K 11/25; H02K 1/14; H02K 5/14; H02K 5/148; F02N 11/10; F02N 11/0814; H02H 7/0822; H02H 7/0852
See application file for complete search history.

(56) References Cited

U.S. PATENT DOCUMENTS 4,593,220 A * 6/1986 Cousins ................. H02K 23/66
                                                          310/239
8,901,797 B2 * 12/2014 Castle ...................... H02K 1/04
                                                          310/179
(Continued)

FOREIGN PATENT DOCUMENTS

DE       19911070 A1    9/2000
FR        2373905 A1    7/1978
(Continued)

OTHER PUBLICATIONS

International Search Report issued in corresponding application No. PCT/FR2016/051528 dated Sep. 6, 2016 (6 pages).
(Continued)

*Primary Examiner* — Naishadh N Desai
(74) *Attorney, Agent, or Firm* — Osha Liang LLP

(57) ABSTRACT

The invention relates mainly to a starter for a heat engine of a motor vehicle comprising:
at least one electromagnetic switch comprising a positive output terminal,
at least one electric motor, said electric motor comprising:
  a stator comprising coils, each of the coils being wound around a pole piece to form a pole,
  at least one brush cage (43),
  at least one positive brush (35) mounted in said brush cage,
  an electrical path between said positive brush (35) and the positive output terminal (32), and
(Continued)

at least one thermal protection (96) located in said electrical path, in which said thermal protection is able to disconnect said two elements (93, 95) when the thermal protection has a temperature above a temperature threshold for electrically disconnecting said positive output terminal with respect to said positive brush (35).

15 Claims, 4 Drawing Sheets

(51) Int. Cl.
    | | |
    |---|---|
    | *H02H 7/08* | (2006.01) |
    | *H02H 7/085* | (2006.01) |
    | *F02N 11/10* | (2006.01) |
    | *H02K 1/14* | (2006.01) |
    | *F02N 11/08* | (2006.01) |

(52) U.S. Cl.
    CPC ............. *H02H 7/0852* (2013.01); *H02K 1/14* (2013.01); *H02K 5/148* (2013.01); *F02N 11/0814* (2013.01)

(56) References Cited

U.S. PATENT DOCUMENTS

| | | | |
|---|---|---|---|
| 2005/0051126 A1* | 3/2005 | Oomi | F02N 15/067 123/179.25 |
| 2013/0200758 A1* | 8/2013 | Muhl | H01R 39/59 310/68 C |
| 2017/0370341 A1* | 12/2017 | Verot | H02K 13/006 |

FOREIGN PATENT DOCUMENTS

| | | |
|---|---|---|
| FR | 2717961 A1 | 9/1995 |
| FR | 2949626 A1 | 3/2011 |
| FR | 2978500 B1 | 3/2015 |
| FR | 3016754 A1 | 7/2015 |

OTHER PUBLICATIONS

Written Opinion of the International Searching Authority issued in corresponding application No. PCT/FR2016/051528 dated Sep. 6, 2016 (6 pages).

International Preliminary Report on Patentability from PCT/FR2016/051528 completed on Dec. 26, 2017 (14 pages).

* cited by examiner

MOTOR VEHICLE STARTER EQUIPPED WITH A THERMAL PROTECTION SYSTEM

The present invention relates to a motor vehicle starter equipped with a thermal protection system. The invention may be applied particularly advantageously, but not exclusively, with the starters of systems for automatic stop and start of heat engines.

In a manner known per se, starters comprise means for overcurrent protection, taking the form of one or more fuses and/or one or more circuit breakers. Thus, FIG. 1 shows an example of a starter motor 1 comprising a fuse 2 mounted in series between a supply terminal 3 of the electrical machine 1 and windings 4.1-4.4 of the stator of said motor.

The fuse is intended to melt to cut the electrical supply to the motor when a predetermined maximum current passes through it. This makes it possible to prevent damage to the starter or its surroundings owing to the heat produced by an excess current. An excess current notably appears when rotation of the motor's rotor is blocked.

In no-load or low-load operation of the machine (i.e. operation between about 0 and 25% of the nominal load), the no-load rotary speed of the rotor also leads to heating of the electrical machine, which may damage the starter over time. This heating, notably due to mechanical friction between the brushes 6.1-6.4 and the commutator, arises for example at overspeed when the starter pinion driven by the heat engine turns more quickly than the shaft driven by the starter's rotor. However, in this case, the current passing through the fuse may be too low to cause melting of the fuse 2, even over a long period.

Document FR140573 filed on 23 January by Valeo describes a compact thermal protection system 5 for cutting the electrical supply to the motor in both the aforementioned cases (in the case of blocking and in the case of operation at low load). More precisely, this system is configured so that in case of overheating, a part overmoulded on the plate of the brush holder deforms, in such a way that the brush cages of positive polarity that are subject to the action of springs come into contact with the plate connected to the terminal with negative polarity. A short-circuit is thus created, causing opening of the starter's fuse.

The invention aims to improve the thermal protection of the starter in the case of a low level of charge of the vehicle's battery that may make opening of the fuse difficult, even in the case of short-circuit.

For this purpose, the invention proposes a starter for a heat engine of a motor vehicle comprising:
  at least one electromagnetic switch comprising a positive output terminal,
    at least one electric motor, said electric motor comprising:
      a stator comprising coils, each of the coils being wound around a pole piece to form a pole,
      at least one brush cage,
      at least one positive brush mounted in said brush cage,
      an electrical path between said positive brush and the positive output terminal, and
    at least one thermal protection located in said electrical path, in which said thermal protection is able to disconnect two elements when the thermal protection has a temperature above a temperature threshold for electrically disconnecting said positive output terminal with respect to said positive brush.

The invention thus makes it possible to cut the supply circuit to the electric motor in a manner that mainly depends on the temperature level in the starter. This thus ensures cutting of the supply circuit regardless of the level of charge of the vehicle's battery.

According to one embodiment, said temperature threshold corresponds to an abnormal condition of the starter causing heating that could damage the vehicle.

According to one embodiment, said thermal protection is arranged in said electric motor in such a way that a main factor allowing the temperature threshold to be reached in case of an abnormal condition is transmission by heat conduction and/or by convection of heat corresponding to an abnormal condition to said thermal protection.

According to one embodiment, at least one other of the elements of said electrical path is a fuse that is able to melt above a predetermined current, said thermal protection and said fuse being two separate elements.

According to one embodiment, in case of short-circuit, said fuse is able to act by melting for electrically disconnecting said positive output terminal with respect to said positive brush.

According to one embodiment, said fuse consists of a positive brush strap.

According to one embodiment, said fuse is located in the electrical path between the thermal protection and a coil connecting bridge.

According to one embodiment, said thermal protection comprises a low melting point solder joining together a first element and a second element of said electrical path, said solder being able to melt above said temperature threshold, in which, in an operating state of the starter, the solder can be in a solid state to connect the first element to the second element, and in the case of an abnormal condition of the starter, said solder can enter the molten state to allow said thermal protection to separate said two elements of the electrical path.

According to one embodiment, one of the elements of said electrical path is a conductor and another element of said electrical path is a connector joining said conductor electrically to at least one coil, these two elements being joined together by said solder.

According to one embodiment, said electrical protection comprises an elastic element that is able to exert pressure on one of the elements of said electrical path joined together by said solder. This thus facilitates disconnection of the two elements in case of overheating.

According to one embodiment, said thermal protection comprises a stop that is able to retain one of the two elements of said electrical path following fusion of the solder. The positioning of the moving free element is thus controlled following fusion of the solder.

According to one embodiment, said thermal protection comprises a device for guiding the movement of one of the two elements of said electrical path following fusion of the solder.

According to one embodiment, said conductor consists of an elongated stud passing through a grommet mounted on said frame.

According to one embodiment, said elastic element, said stop, and said guiding device are integral with said grommet.

According to one embodiment, said connector is in the form of a hook.

According to one embodiment, said hook comprises a portion of a ring partly surrounding the conductor and a tab for electrical connection to said coils.

According to one embodiment, said connector is connected to the coils by means of a connecting bridge, called coil bridge, soldered to at least one coil.

According to one embodiment, said coil bridge is mounted electrically between said connector and said coils.

According to one embodiment, positive brush braids are soldered to said coil bridge.

According to one embodiment, a second connecting bridge is soldered to an output of at least one coil and soldered to positive brush braids.

According to one embodiment, a fuse is mounted between said connector and said coil bridge.

According to one embodiment, an insulating layer arranged for electrically insulating said brush cage relative to a supporting plate is deformable starting from another temperature threshold, and an elastic means pressing said positive brush against a contact plate of a commutator is able to establish contact between said brush cage and said supporting plate following deformation of said deformable insulating layer.

The invention will be better understood on reading the description given hereunder and on examining the accompanying figures. These figures are only given for purposes of illustration and do not limit the invention in any way.

FIG. 1, already described, shows a schematic diagram of an electric motor of a motor vehicle starter equipped with a thermal protection system;

Elements that are identical, similar, or analogous keep the same reference from one figure to another.

Figure 2:
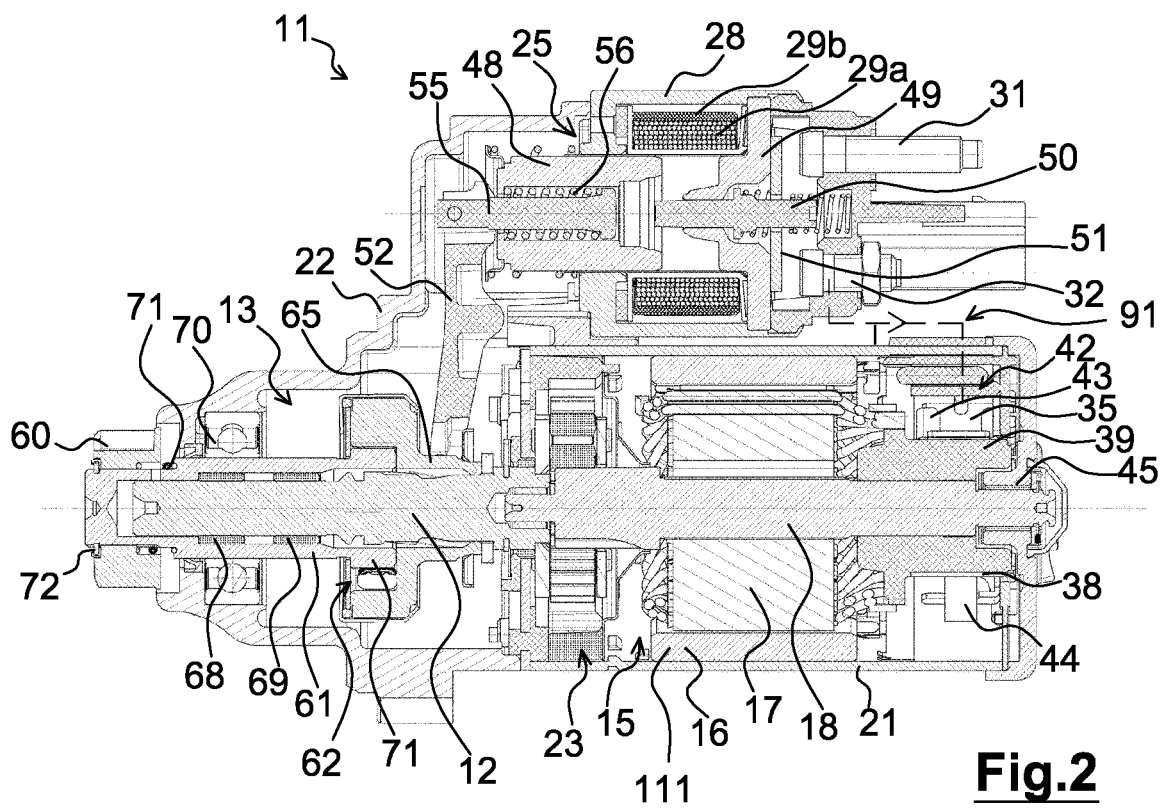
FIG. 2 is a longitudinal sectional view of a starter of a motor vehicle heat engine according to the present invention.

Referring to FIG. 2, the starter 11 according to the invention notably comprises a drive shaft 12, a starter 13 mounted on the drive shaft 12, and an electric motor 15 consisting of an inducing stator 16 and an induced rotor 17 integral with a shaft 18. The motor 15 comprises a frame 21 mounted on a support 22 of the starter 11 intended to be fixed on a fixed part of the motor vehicle.

A speed reducer 23 with gears of the epicycloid type is preferably inserted between a rear end of the drive shaft 12 and the shaft 18 of the electric motor 15.

The starter 11 also comprises an electromagnetic switch 25 extending parallel to the electric motor 15, being installed radially above the latter. The switch 25 has a metal casing 28 equipped with a set of exciting coils 29a, 29b. Terminals 31, 32 are configured so that they each form a fixed contact inside the casing 28. One of the terminals 31 is intended to be connected to the positive terminal of the vehicle's battery. The other terminal 32, called positive output terminal, is connected to the input of the inducing winding of the stator 16 and to the brushes 35 with positive polarities, as is explained in more detail hereunder.

These brushes 35 rub on conductive plates 38 of a commutator 39 to supply the rotor winding. The brushes 35 belong to a brush holder 42 equipped with cages 43 to guide and receive the brushes 35. These brushes 35 are pressed towards the conductive plates 38 by elastic means 44 of the spring type. A bearing 45 of the rear flange serves for rotatable mounting of one end of the shaft 18 of the electric motor 15.

In a known manner, on excitation of the pull-in coil 29a, a moving core 48 is drawn by magnetic attraction towards a fixed core 49 of the switch 25, to act on the one hand, after compensating any play, on a rod 50 bearing a moving contact 51 to cause closure of the contacts 31, 32 of the switch 25 and supply the electric motor 15, and on the other hand to actuate a control lever 52 acting on the starter 13. The upper end of the lever 52 is mounted in a known manner, hinged on a moving rod 55 connected elastically to the moving core 48 via a spring 56, called a tooth-against-tooth spring, housed in the moving core 48.

The starter 13 may thus pass from a position of rest in which a drive pinion 60 is located at a distance from the starter ring gear of the heat engine to an active position in which the drive pinion 60 interacts with the starter ring gear of the heat engine. The drive shaft 12 then transmits torque from the electric motor 15 to the drive pinion 60 by means of a pinion body 61, via a free-wheeling mechanism 62. Following deactivation of switch 25, the starter 13 returns from its active position to its position of rest.

When the starter 13 is in an active position, the pinion body 61 is driven, via the free-wheeling mechanism 62, by a driver 65. For this purpose, the pinion body 61 is mounted on the drive shaft by means of two pads 68, 69 of annular shape.

The pinion body 61 is mounted rotatably in a front bearing 70 of the support 22. As an example, this bearing 70 consists of a ball bearing or, as a variant, a needle bearing, or a plain bearing.

The free-wheeling mechanism 62 is, for example, of the type with rollers, but could as a variant be replaced by a cone clutch device or a clutch equipped with several friction disks, as described in document FR2978500.

In a known manner, the driver 65 is provided internally with helicoidal splines engaging in complementary fashion with external helicoidal teeth on the drive shaft 12. Thus, a helicoidal movement is imparted to the starter 13 when it is displaced by the lever 52 to come into the active position, by means of the pinion 60, in engagement with the starter ring gear of the heat engine.

The drive pinion 60 being connected in rotation and mounted sliding axially relative to the pinion body 61 by means of sets of grooves of complementary shape, a spring 71 presses the drive pinion 60 towards an axial stop 72 formed for example by a circlip. The spring 71 will be compressed in such a way that the pinion 60 moves back in case of impact of the pinion 60 with the starter ring gear.

Figure 3:
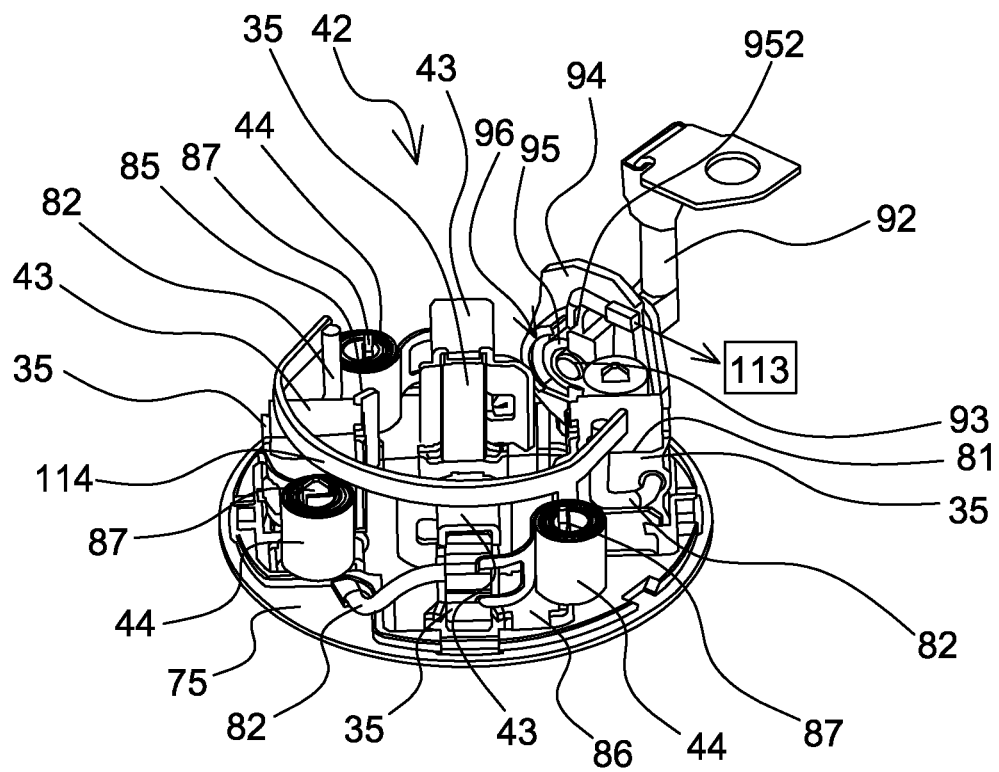
FIG. 3 shows a perspective view of a brush holder belonging to the starter in FIG. 2.
Figure 6:
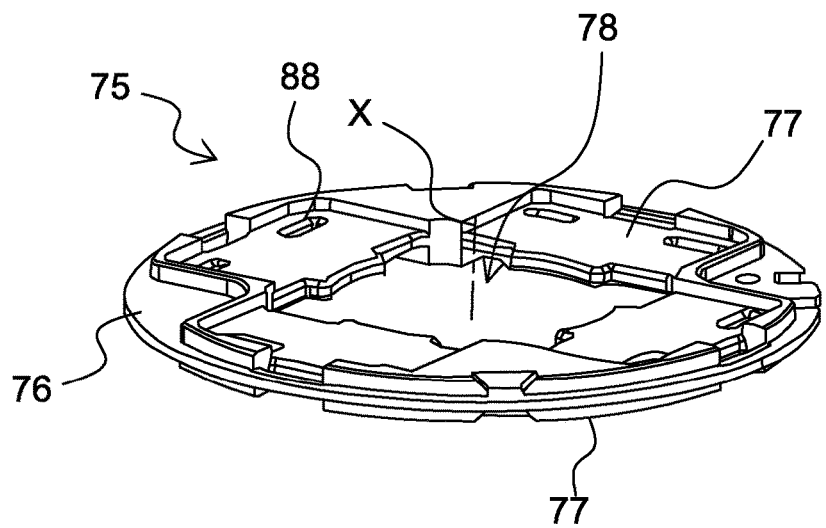
FIG. 6 is a perspective representation of the supporting plate of the brush holder in FIG. 3.

FIG. 3 is a detailed view of the brush holder 42 with axis X comprising a supporting plate 75 of roughly annular shape on which the set of cages 43 is fixed, each serving as a housing for a brush 35. As can clearly be seen in FIG. 6, the supporting plate 75 is of a single piece comprising a metal plate 76 and overmoulded layers 77 provided on either side of the metal plate 76. The overmoulded layers 77 are made of plastic for good electrical insulation. The overmoulded layers 77 protect, at least partly, the brush supporting face as well as the opposite face. The overmoulded layers 77 are sensitive to heat and are deformable starting from a temperature threshold T1. The temperature threshold T1 corresponds to a temperature above which the starter 11 and/or its surroundings would possibly be damaged.

Various plastics are usable depending on the applications and the stresses to which they are subjected. Typically, the plastic used for the overmoulded layers 77 is a thermoplastic such as a polyamide PA4.6 or PA6.6 or a polypropylene PPS filled with glass fibres to between 40 and 50%. Thermosetting plastics may also be envisaged. The metal plate 76 is typically obtained by stamping from a free-machining steel, for example FePO5.

The supporting plate 75 and the cages 43 that it carries will be fixed on the flange forming the rear bearing 45 for the shaft 18 of the electric motor 15. Furthermore, the central part of plate 75 comprises an opening 78 by which the assembly that it forms with the cages 43 and the brushes 35 is mounted around the shaft 18 of the electric motor 15.

Each brush 35 is mounted with sliding motion inside a cage 43, which is open on the side of the axis X to allow electrical contact of the brushes 35 with the plates 38 of the commutator 39. More precisely, each cage 43 is made by folding a thin plate of sheet metal, the end branches of which are fixed on the plate 75. One of the side walls has a notch 81, visible in FIG. 3, to allow passage of the arm of the corresponding spring 44. From the outer face of the commutator 39, each cage 43 may comprise flaps 85 extending on either side of the brush 35 to prevent dust generated by the friction of the brushes 35 with the plates 38 affecting the operation of the brush holder 42.

Each cage 43 further comprises a system for fixing to the plate 75. Each fixing system is formed for example by tabs 86 interacting with the openings 88 made in the plate 75. Alternatively, the cages 43 are fixed on the plate 75 by means of rivets.

Moreover, a spiral spring 44 associated with each cage 43 presses the corresponding brush 35 radially towards the contact plates 38 of the commutator 39. Each spring 44 comprises a wound part formed by a plurality of turns, as well as an arm intended to bear against the rear face of the corresponding brush 35. Each spring 44 is in this case mounted around a holding system 87 formed by a pin extending axially relative to the axis X.

The brushes 35 of positive polarity are connected electrically to the positive output terminal 32 of the switch 25 via an electrical path 91. This electrical path 91 is thus formed by the set of elements conducting the current between the output terminal 32 and the brushes 35 of positive polarity. As can be seen in FIG. 3, this electrical path 91 is notably formed by the following elements:
  a first conductor 92 providing electrical connection between the positive output terminal 32 of the switch 25 and a second conductor 93,
  said second conductor 93 consisting of a rigid elongated stud passing through a grommet 94 interacting with the frame 21 for hermetically isolating the brush holder 42 with respect to the external environment, and
  a connector 95
having a hook shape. As is more easily seen in FIG. 4, the connector 95 comprises a ring portion 951 partly surrounding the stud 93 and a tab 952 to be connected electrically to coils 111 belonging to the stator 16 of the electric motor 15. These coils 111 are each mounted around a pole piece to form a pole.

Figure 5A:
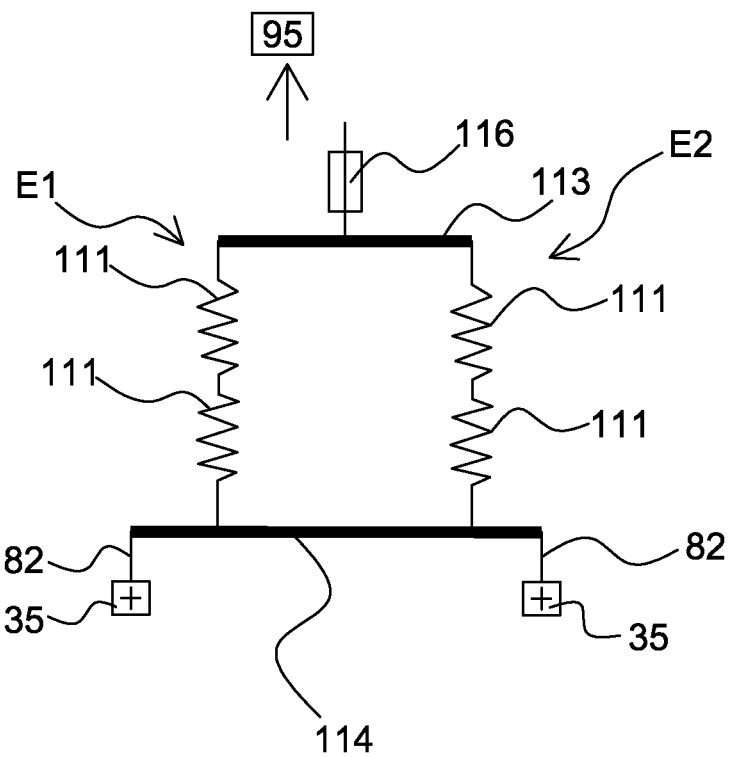
FIGS. 5a and 5b are circuit diagrams illustrating variants of connection of the coils of the stator belonging to the electric motor of the starter according to the present invention.

Thus, in the embodiment in FIG. 5a, two sets E1, E2 of coils 111 are mounted in parallel, each set E1, E2 comprising two coils 111 mounted electrically in series. The first ends of the two sets E1, E2 are soldered to a first connecting bridge 113, called a coil bridge, to which the tab 952 is also connected electrically. The second ends of the two sets E1, E2 are soldered to a second connecting bridge 114. The braids of the positive brushes 35 are also soldered to the connecting bridge 114.

Figure 1:
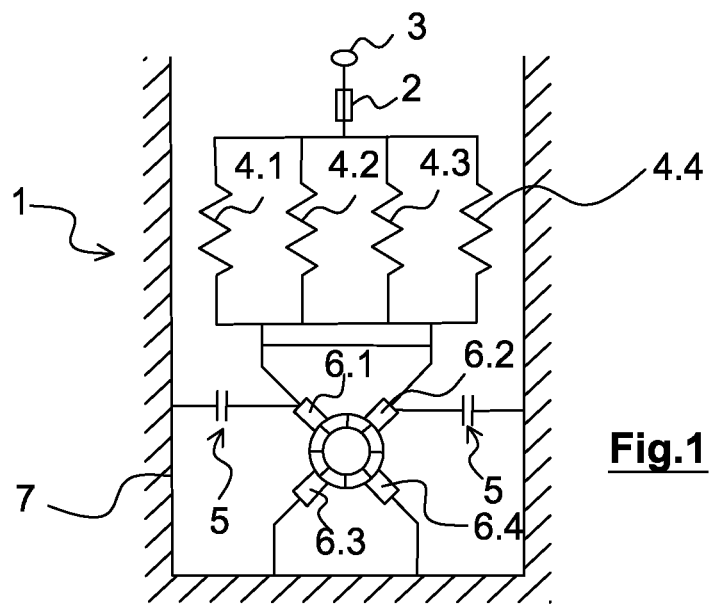

As a variant, all the coils 111 are connected in parallel with one another between the two bridges 113, 114, as in the embodiment in FIG. 1.

Figure 5B:
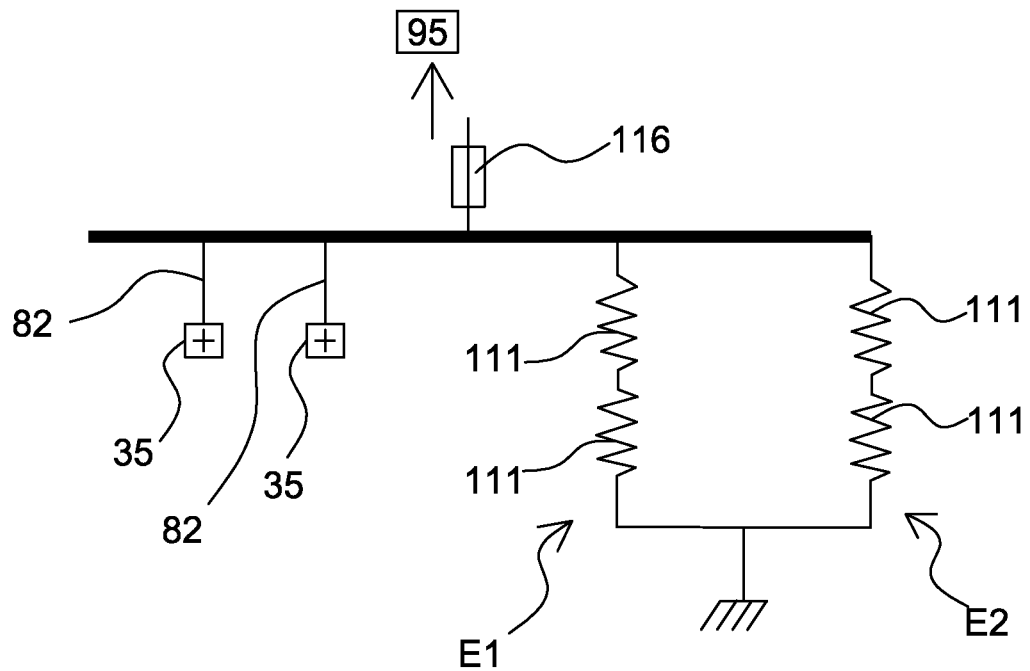

In the embodiment in FIG. 5b, two sets E1, E2 of coils 111 are mounted in parallel, each set E1, E2 comprising two coils 111 mounted electrically in series. The first ends of the two sets E1, E2 as well as the braids of the positive brushes 35 are soldered to the coil bridge 113, to which the tab 952 is also connected electrically. The second ends of the two sets E1, E2 of coils are connected electrically to earth.

Furthermore, one of the elements located in the electrical path 91 is a fuse that is able to melt above a predetermined current, for example of the order of 100 A. Thus, in case of a short-circuit generating such a current, the fuse acts by melting for electrically disconnecting the positive output terminal 32 with respect to the positive brush 35. In this case, a fuse 116 is used, mounted between the connector 95 and the coil bridge 113 employed in the embodiment in FIGS. 5a and 5b. Alternatively or additionally, two fuses are used, each consisting of a flexible braid 82 of positive brush 35 made of copper or copper alloy. As a variant, it would be possible to use dedicated fuses inserted in the electrical path 91.

Figure 4:
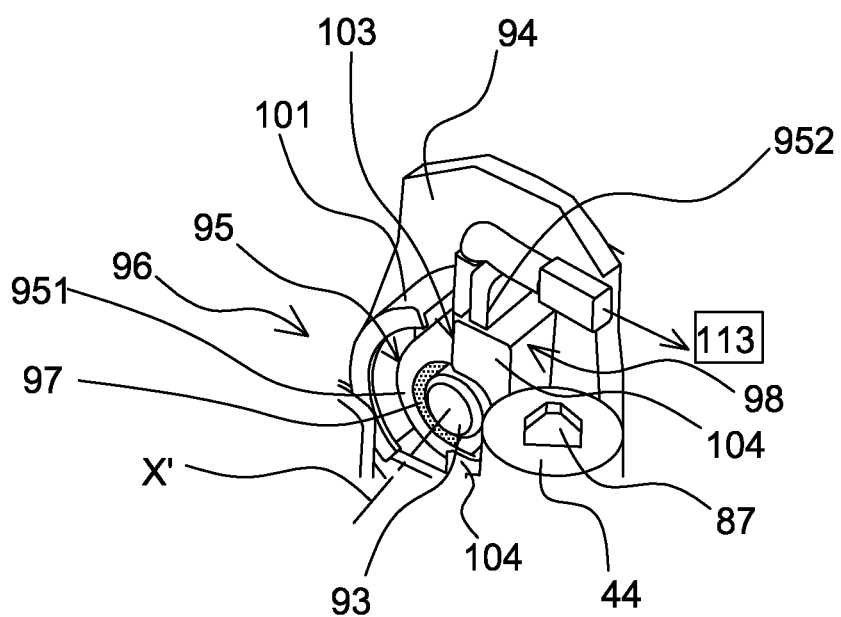
FIG. 4 is a detailed perspective view of an embodiment example of the thermal protection employed in the motor vehicle starter according to the present invention.

Moreover, a thermal protection 96 separate from the fuse is located in the electrical path 91. In this case, as can be seen in FIGS. 3 and 4, the thermal protection 96 comprises a solder 97 with a low melting point connecting the connector 95 to the stud 93, via the portion 951.

The solder 97 is thus able to melt above a temperature threshold T2 corresponding to an abnormal condition of the starter causing heating that could damage the vehicle. This temperature threshold T2 is below 300° C. and for example between 230° C. and 260° C. The solder 97 is preferably formed from an alloy of copper and tin, the level of copper being below 10%. The level of copper is for example of the order of 2%.

The thermal protection 96 is arranged in the electric motor 15 in such a way that a main factor allowing the temperature threshold T2 to be reached in the case of an abnormal condition is transmission by heat conduction and/or by convection of heat corresponding to the abnormal condition to the thermal protection 96, and not a current passing through the thermal protection 96. This heat may for example be generated notably by dust due to wear of the brushes 35, a malfunction of a mechanical component, or an electrical malfunction of the starter.

The thermal protection 96 is in this case located near the rear bearing inside the interior space delimited by the frame 21. As a variant, the positioning may be adapted so that the thermal protection can be located outside the frame 21. In all cases, the thermal protection 96 is positioned near the elements that are likely to generate considerable heat in the case of an abnormal condition for transmission by convection and/or by conduction to the thermal protection 96.

Furthermore, it should be noted that the solder of the thermal protection 96 does not necessarily have the highest electrical resistance of the elements of the electrical path 91. Preferably, the thermal protection 96 even has a low electrical resistance so that the current contributes to its heating as little as possible.

Furthermore, in certain cases, the melting point of the solder 96 may be lower than all the melting points of the various elements of the electrical path 91.

However, in other cases, the melting point of the solder 96 is above the melting point of the fuse, in this case consisting of one or more braids 82. However, owing to the aforementioned arrangement of the thermal protection 96, the thermal protection 96 may have a higher temperature than the fuse in the case of an abnormal operating condition, which causes the thermal protection 96 to melt before the fuse.

Preferably, the thermal protection 96 further comprises an elastic element 98 pretensioned axially between the brush holder 42 (here the plate 75 of the brush holder 42) and the connector 95. This elastic element 98 is able to exert an axial pressure on the connector 95. In this case, the elastic element 98 consists of at least one stud forming a single piece with the grommet 94 pretensioned radially relative to the axis X' of the stud 93 between the grommet and the tab 952 of the connector 95. When the solder 97 is in the solid state, it connects the connector 95 to the stud 93, and allows the connector 95 to withstand the axial force applied by the pretensioned elastic element 98. However, when the solder 97 then enters the molten state, the connector 95, which is no longer retained by the solder 97, is moved away from the stud 93 owing to the force exerted by the elastic element 98.

As can be seen in FIG. 4, the thermal protection 96 preferably comprises a stop 101 that is able to retain the connector 95 following fusion of the solder 97. The final positioning of the connector 95 after its displacement caused by the elastic element 98 is thus controlled. In the embodiment in FIG. 4, the stop 101 has the form of a portion of a ring located opposite the portion 951.

The thermal protection 96 further comprises a guiding device 103 of the displacement of the connector 95 following fusion of the solder. This guiding device 103 is formed by two guides 104 located on either side of the stud 93, providing radial guidance relative to the axis X' of the connector 95 towards the stop 101. These guides 104 also provide axial guidance relative to axis X' of the stud 93 to prevent the connector 95 falling into the brush holder 42, which could cause short-circuit problems.

Moreover, the brushes 35 of negative polarity intended for current return are connected electrically to the frame of the machine by means of their respective braid 82 welded on the plate 76. The brushes 35 of positive polarity and their corresponding cage 43 are insulated electrically from the negative polarity for proper operation of the starter 11. This insulation is provided by the overmoulded layers 77.

Activation of the thermal protection 96 in the case of malfunction of the starter 11 is described below.

In the case of a short-circuit occurring in the electric motor of the starter while the vehicle's battery has a high level of charge, the fuse 116 and/or the two braids 82 of brushes forming a fuse will melt one after the other. In fact, owing to their different resistances (it is in fact impossible to produce braids 82 having exactly identical resistances), one of the braids 82 melts before the other in the case of a short-circuit. When one of the braids has melted, the other will melt immediately thereafter because of the considerable increase in current passing through the brushes 35 to which the second braid is connected.

In the case when the level of charge of the vehicle's battery is high and a malfunction occurs that does not necessarily generate a short-circuit, such as notably overheating caused for example by no-load operation of the starter 11 for a long time, the temperature threshold T1 is reached. The insulating layers 77 overmoulded on the plate 75 then deform, so that the force exerted by the spring 44 on the holding system 87 causes swivelling of the cages 43 of positive polarity, which then come into contact with the metal plate 76 to establish a short-circuit. This short-circuit causes a considerable increase in the current passing through the machine, which has the effect of causing the braids 82 to melt, thus cutting the supply to the electric motor.

Figure 7:
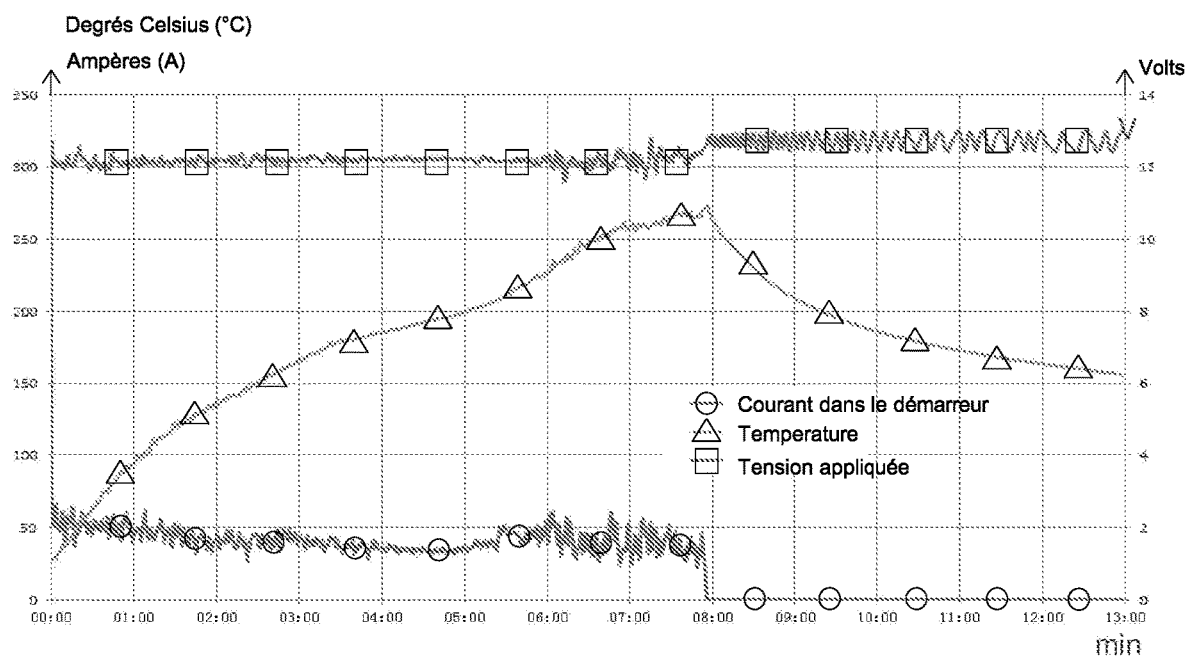
FIG. 7 is a graph showing the variation, as a function of time, of the temperature of the starter, of the supply voltage of the starter, and of the current circulating in the commutator during activation of the thermal protection.

In the case illustrated in FIG. 7, where the level of charge of the vehicle's battery is low and overheating occurs, caused for example by no-load operation of the starter 11 for a long time, the temperature rises in the starter whereas the current does not reach the threshold current (here 100 A) allowing fusion of the braids of the positive brushes forming a fuse. Then, when the temperature reaches the melting point of the solder 97, which is in this case slightly above 250 degrees Celsius, the connector 95, which is no longer retained by the solder 97, is moved away from the stud 93 owing to the force exerted by the elastic element 98. This has the effect of disconnecting the output terminal 32 electrically with respect to the brushes of positive polarity 35. The starter 11 then passes from the operational state to a non-operational state of the starter 11 in which the motor 15 is no longer supplied because the electrical path 91 has been cut. Note that during its displacement, the connector 95 is guided by the guiding device 103 towards the stop 101, which then stops its displacement to prevent the latter causing short-circuits.

We thus have two systems for thermal protection of the starter 11, which will be able to act in different operating conditions of the starter. As a variant, it would be possible to dispense with the thermal protection system based on the use of the overmoulded plate generating the short-circuit, using only the thermal protection 96 with the fuse 116 and/or the fuses formed here by the braids 82 of the positive brushes.

A person skilled in the art will of course be able to modify the configuration of the brush holder 42 described above, while remaining within the scope of the invention.

Thus, as a variant, the thermal protection 96 is located between two other elements of the electrical path 91, for example between the first conductor 92 and the second conductor 93.

As a variant, the electrical path 91 does not have a second conductor 93, the first conductor 92 passing inside the grommet 94 and being connected directly to the connector 95.

As a variant, the elastic element 98 exerts a radial force on the connector 95, being pretensioned radially relative to the axis X for example between the connector 95 and the frame 21.

As a variant, the thermal protection 96 lacks an elastic element 98, separation of the two elements 93, 95 following fusion of the solder 97 being effected solely by gravity.

Alternatively, the plate 75 is connected electrically to the positive polarity. The spiral spring 44 may also be replaced with a cylindrical spring supported by the cover to push the corresponding brush 35 against the plates 38 of the commutator 39.

As a variant, the brush holder 42 comprises more than four brushes 35, and each brush 35 may for example be associated with another brush 35 positioned on the side opposite the plate 75.

The brush holder 42 is in this case a machine brush holder of a motor vehicle starter. As a variant, the brush holder could also belong to an alternator or to an alternator-starter.

The invention claimed is:

1. A starter for a heat engine of a motor vehicle comprising:
   at least one electromagnetic switch comprising a positive output terminal; and at least one electric motor, said electric motor comprising:
a stator comprising coils, each of the coils being wound around a pole piece to form a pole,
at least one brush cage,
at least one positive brush mounted in said brush cage,
an electrical path between said positive brush and the positive output terminal, and
at least one thermal protection located in said electrical path,
wherein said thermal protection is configured to disconnect two of a plurality of elements when the thermal protection has a temperature above a temperature threshold for electrically disconnecting said positive output terminal with respect to said positive brush, and
wherein at least one other of the plurality of elements of said electrical path is a fuse configured to melt above a predetermined current, wherein said thermal protection and said fuse are two separate elements.

2. The starter according to claim 1, wherein said temperature threshold corresponds to an abnormal condition of the starter causing heating that could damage the vehicle.

3. The starter according to claim 1, wherein said thermal protection is arranged in said electric motor so that a main factor allowing the temperature threshold to be reached in case of an abnormal condition is transmission of heat corresponding to an abnormal operating condition to said thermal protection, by heat conduction and/or by convection.

4. The starter according to claim 1, wherein, in case of short-circuit, said fuse is able to act by melting and electrically disconnect said positive output terminal with respect to said positive brush.

5. The starter according to claim 1, wherein said fuse consists of a braid of the positive brush.

6. The starter according to claim 1, wherein said fuse is located in the electrical path between the thermal protection and a coil connecting bridge.

7. The starter according to claim 1, in wherein which said thermal protection comprises a solder with a low melting point joining together a first element and a second element of said electrical path, said solder being able to melt above said temperature threshold, wherein, in an operating state of the starter, the solder is able to be in a solid state to connect the first element to the second element, and in case of an abnormal condition on the starter, said solder is able to pass into the molten state to allow said thermal protection to separate said two elements of the electrical path.

8. The starter according to claim 7, wherein said thermal protection comprises a stop that is able to retain one of the two elements of said electrical path following fusion of the solder.

9. The starter according to claim 7, wherein said thermal protection comprises a guiding device of the movement of one of the two elements of said electrical path following fusion of the solder.

10. The starter according to claim 9, wherein said conductor consists of an elongated stud passing through a grommet mounted on said frame.

11. The starter according to claim 8, wherein said elecrical protection comprises an elastic element able to exert a pressure on one of the elements of said electrical path joined together by said solder, wherein said elastic element, said stop, and said guiding device are integral with said grommet.

12. The starter according to claim 8, wherein one of the elements of said electrical path is a conductor and another element of said electrical path is a connector joining said conductor electrically to at least one coil, these two elements being joined together by said solder, and wherein said connector is in the form of a hook.

13. The starter according to claim 5, wherein said hook 15 comprises a portion of a ring partly surrounding the conductor and a tab for connecting electrically to said coils.

14. The starter according to claim 8, wherein one of the elements of said electrical path is a conductor and another element of said electrical path is a connector joining said conductor electrically to at least one coil, these two elements being joined together by said solder, and wherein said connector is connected to the coils via a connecting bridge, called coil bridge, soldered to at least one coil.

15. The starter according to claim 14, wherein said coil bridge is mounted electrically between said connector and said coils.

* * * * *